May 19, 1953  C. R. JOHNSON  2,638,959
NONWOVEN SOFT-SURFACE FLOOR COVERING AND METHOD
AND APPARATUS FOR PRODUCING THE SAME
Filed Aug. 18, 1951  4 Sheets-Sheet 1

Charles R. Johnson
Inventor
by [signature]
Attorney

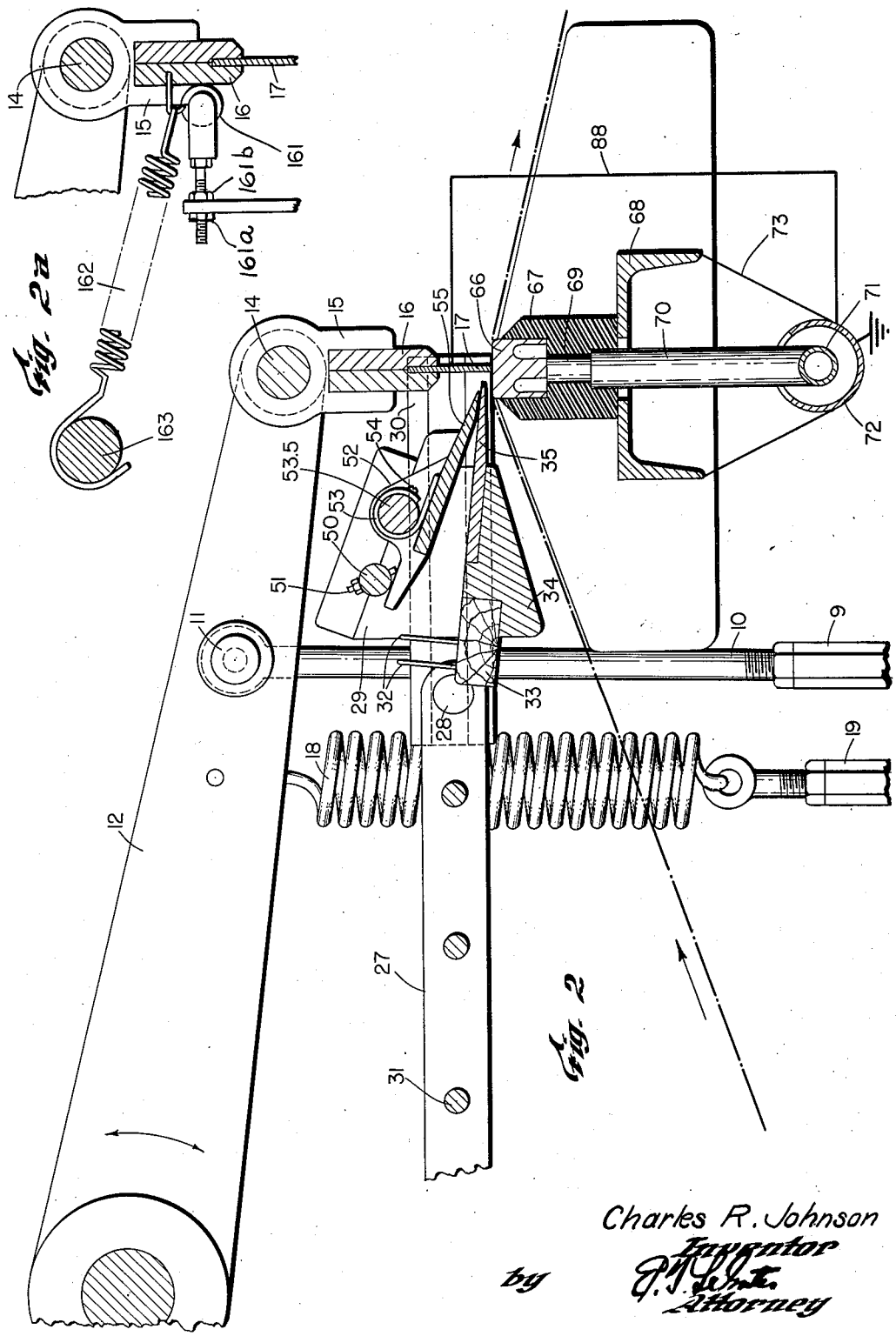

May 19, 1953  C. R. JOHNSON  2,638,959
NONWOVEN SOFT-SURFACE FLOOR COVERING AND METHOD
AND APPARATUS FOR PRODUCING THE SAME
Filed Aug. 18, 1951  4 Sheets-Sheet 3
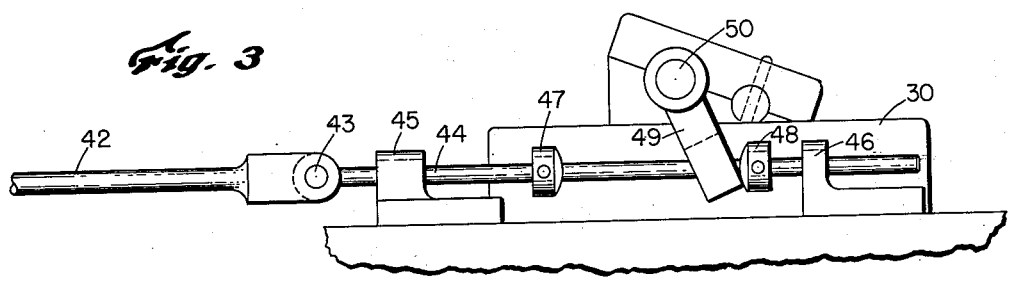
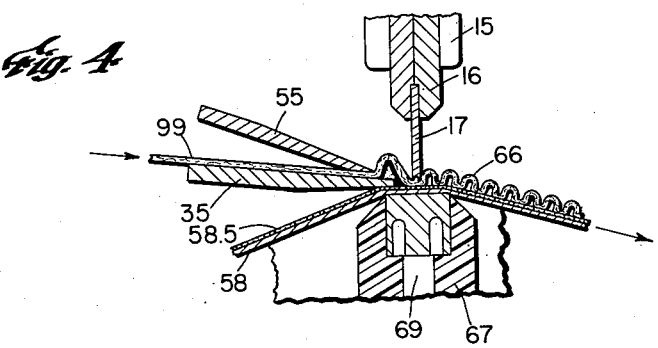
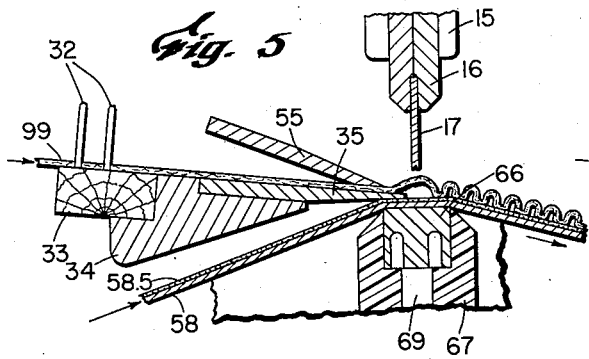
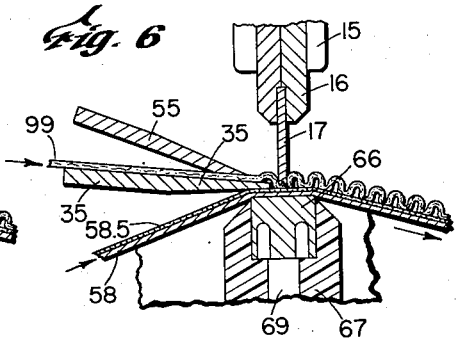
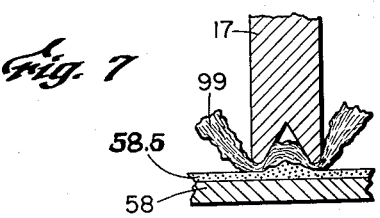
Charles R. Johnson
Inventor May 19, 1953 C. R. JOHNSON 2,638,959
NONWOVEN SOFT-SURFACE FLOOR COVERING AND METHOD
AND APPARATUS FOR PRODUCING THE SAME
Filed Aug. 18, 1951 4 Sheets-Sheet 4

INVENTOR
CHARLES R. JOHNSON
BY
ATT'Y.

Patented May 19, 1953

2,638,959

UNITED STATES PATENT OFFICE 2,638,959

NONWOVEN SOFT-SURFACE FLOOR COVERING AND METHOD AND APPARATUS FOR PRODUCING THE SAME

Charles R. Johnson, Longmeadow, Mass., assignor to Bigelow-Sanford Carpet Company, Inc., Thompsonville, Conn., a corporation of Delaware Application August 18, 1951, Serial No. 242,515

18 Claims. (Cl. 154—1.1)

This invention relates to a method and apparatus for producing a non-woven soft-surface floor covering, and to such a floor covering.

The principal object of the invention is to provide a method and an apparatus for producing a floor covering in which a textile surface or facing material is securely adhered in rows to a backing sheet of a suitable material, and to provide such a floor covering having high and low pile loops in the same transverse row.

According to my preferred practice a flexible backing sheet is coated with a thermoresponsive adhesive and is fed forward intermittently and during the dwells bights of the surface material are pressed in rows across the width of the backing sheet into the soft or softened adhesive. The adhesive is responsive to heating by dielectric losses produced by a high frequency electric field simultaneously with the pressing of the bights of the surface material into the adhesive, thus creating, on the lines where the bights of the surface material are applied, a firm bond between that material and the backing sheet.

The surface material is soft and may be a sheet of felt or preferably a sheet or layer of carded wool or of strands of roving or of pile yarns of wool, rayon or other fibrous material.

The backing sheet is flexible, relatively smooth-surfaced and substantially uniform in thickness and composition. By uniform in composition I do not necessarily mean homogeneous, but only that the sheet does not vary in composition from place to place.

My novel process and the apparatus by which my invention may be carried out are illustrated in the accompanying drawings, in which:

Fig. 2 is a detail side view, partly in section, to an enlarged scale, showing means for operating the electrode and the surface material grippers;

Fig. 2a is a side view, partly in section, of the means for adjusting the position of the electrode;

Fig. 3 is an elevational view of the means for operating the grippers;

Figs. 4, 5 and 6 are side views, partly in cross-section, showing the positions of the electrode at successive stages of the process;

Fig. 7 is an enlarged cross-section of the end of the electrode;

Figure 1:
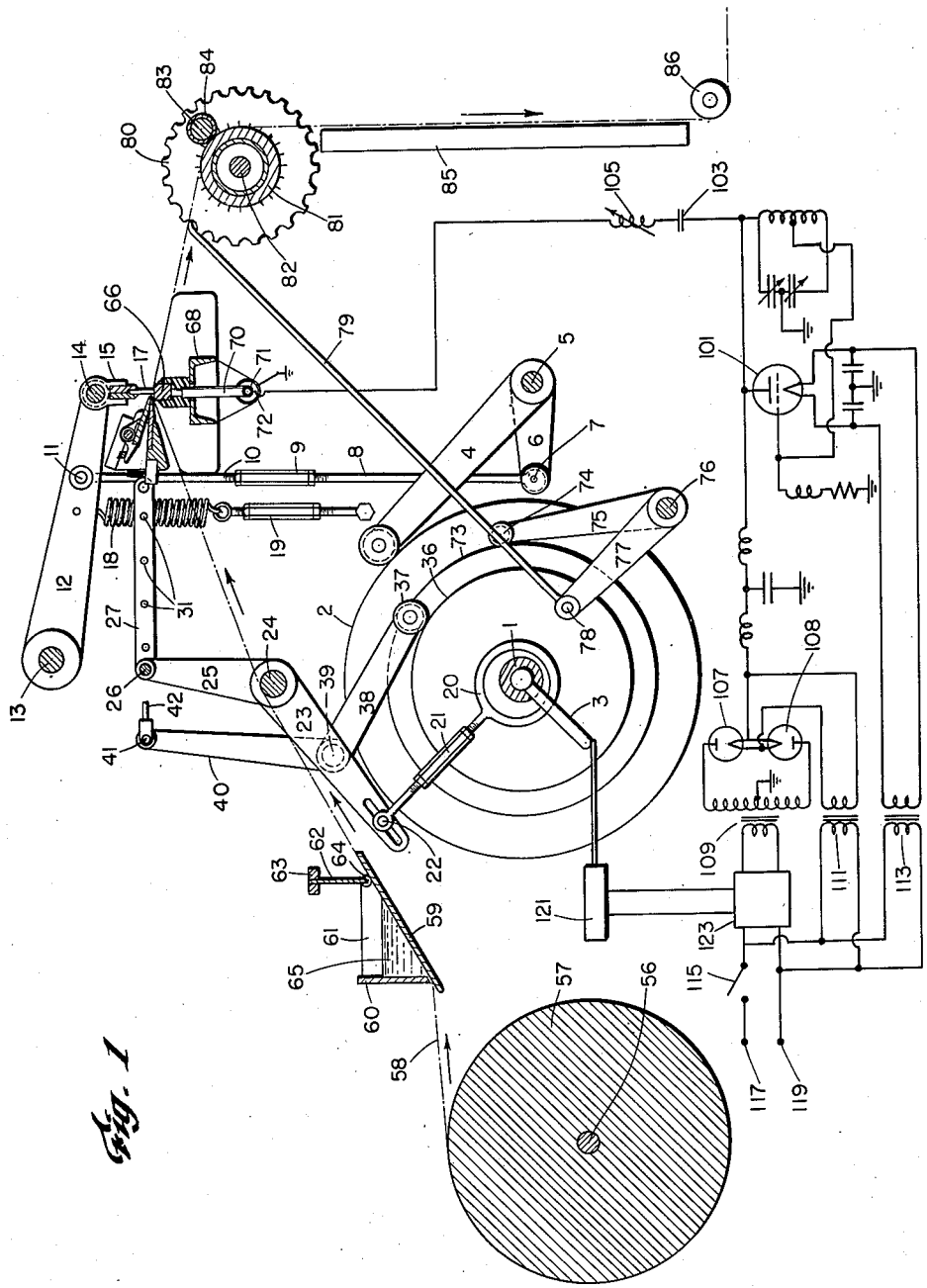
Fig. 1 is a side view, partly in cross-section, of apparatus by which my process may be practiced, together with a circuit diagram of apparatus for applying the high-frequency field.

The main shaft 1, Fig. 1, is rotated by an electric motor driving through a gear train (not shown). On the main shaft are components which control the motions of the several devices.

The general operation of the machine, Fig. 1, is as follows: The backing sheet 58, wound in a roll 57, is drawn step by step through the machine by a spike roll 81 from which it descends and passes around guide roll 86 to be rolled up. The backing sheet passes through a trough 61 wherein the adhesive 65 is applied to its upper surface. The backing sheet with its coating of adhesive passes over and dwells on the anvil electrode 66 and below the upper electrode 17. At this point the surface material 99, Fig. 4, is positioned over the coated backing and the upper electrode is pressed down to form a row of bights in the facing material which the electrode presses against the adhesive. At this instant the high frequency field is applied long enough to act upon the adhesive which is heat responsive. When the preferred adhesive is used, it is set by the heat to fix the bights firmly to the backing sheet. The adhesive may be one which is softened by the heat to receive the bights of the facing material and is then set either by the heat or by cooling when the field is cut off. The backing sheet with the surface material attached thereto is drawn forward by the spike roll a distance equal to that between the rows of the surface material and a fresh part of the coated backing sheet is brought between the electrodes and a length of the surface material is again fed to be attached to the backing sheet.

To feed the backing sheet 58, cam 73 on main shaft 1, Fig. 1, rocks lever 75 on shaft 76, thereby rocking lever 77 pivoted at 78 to pawl 79. This pawl rotates ratchet wheel 80 to intermittently rotate shaft 82 and spike roll 81. The sheet with the surface material thereon is pressed down on the spike roll by a steel weighted roll 83 having a rubber covering 84.

The spike roll is timed to advance the backing sheet when the electrode 17 is up.

After passing over the spike roll, the sheet with loops of surface material attached thereto is passed in front of a radiant heating panel 85 to further set and solidify the adhesive, particularly that between the rows of attached surface material. The sheet is then delivered around guide roll 86.

To apply the adhesive to the backing sheet which is wound in a roll 57, on shaft 56, Fig. 1, the backing sheet 58 is passed under plate 60 into a tank containing the adhesive 65. The sheet 58 is supported by plate 59 with wood blocks 61 on the sides to retain the adhesive and keep it off the edges of the sheet. Plate 62, weighted by weights 63, presses a bar 64 down on the coated sheet to remove excess adhesive.

The preferred thermoresponsive adhesive applied to the backing sheet is one which is sufficiently soft at room temperature to permit the U-shaped bights of surface material to be embedded therein by the pressure of the electrode 17 and which is solidified by the simultaneous application of the high frequency electric field so that it securely binds the bights of the surface material. The most satisfactory adhesives now known to me for this purpose are the plastisol pastes. These pastes, which are flowable and spreadable at room temperature (i. e., when ungelled), comprise a dispersion of a finely-divided polyvinyl chloride polymer (or copolymer in which the polyvinyl chloride exceeds about 90% by weight of the copolymer) in a plasticizer which is not a solvent for the resin at room temperature but which at elevated temperatures is capable of dissolving in the resin. When applied to the backing sheet, these materials are sufficiently soft to receive the bights of the surface material pressed therein, and when heated at the same time by the high frequency field for a fraction of a second, they are converted to a permanently solid (or gelled) state in which they securely bind the bights of the surface material to the backing sheet. I also may use a thermosetting resin type of adhesive provided this is adequately plasticized or provided the end use to which my product is to be put does not demand that the product be highly flexible. Typical of the thermosetting resins which I have found effective are the urea-formaldehyde resin adhesives, the phenol-formaldehyde resin adhesives and similar adhesives based on thermosetting resins. Adhesives of this latter class are provided on the backing sheet with the resin in the A or B stage, from which state they are advanced by the application of heat by the high frequency field to the insoluble, infusible C stage. I also may include the so-called thermoplastic-thermosetting resin adhesives, such as those formed from the reaction product of polyvinyl butyral with melamine formaldehyde, which may be solid initially but capable of being first softened and then solidified and set by the heat. While it is preferred, as indicated above, that the adhesive be liquid or semi-liquid as a paste, it is possible to use the adhesive in the form of a thin layer of powder suitably bonded to the backing sheet.

The thickness of the adhesive on the backing sheet may range from .005 to .040 inch as best suited to insure a firm bond with the surface material.

To feed the sheet or layer of surface material, eccentric 20 on main shaft 1 imparts an oscillating motion to shaft 24 through adjustable link 21, adjustable pivot 22 and lever 23. Lever 25, keyed to shaft 24, imparts a reciprocating motion to rod 27 to which the lever is pivoted at 26. The forward end of rod 27 is connected by pivot 28, Fig. 2, to slide 29 which slides back and forth in bracket 30.

The surface material, preferably in the form of strands of roving or pile yarn from a creel (not shown) is laced through lease rods 31. It passes between two rods of vertical pins 32, set into wood block 33, and passes over lower gripper 35, which is carried by bracket 34 fastened to slide 29. The upper gripper 55 is pivoted on slide 29.

To open and close the grippers 35 and 55, cam 36 on main shaft 1, Fig. 1, through follower 37 rocks lever 38 fixed on shaft 39. Shaft 39 rocks lever 40 pivoted at 41 to rod 42 causing the rod to move back and forth. To operate the upper gripper 55, rod 44, Fig. 3, is pivoted at 43 to rod 42. Rod 44 slides back and forth in guide blocks 45 and 46. Collars 47 and 48 are fastened by set screws on rod 44. When rod 44 is moved rearward, collar 48 moves lever 49 to rotate shaft 50 forcing cam screw 51, Fig. 2, to press down tail of bracket 52 pivoted on shaft 53.5 to raise and open upper gripper 55. When rod 44 moves forward collar 47 rocks lever 49 to remove cam screw 51 from tail of bracket 52 thereby allowing spring 53, Fig. 2, attached to shaft 53.5 by screw 54 to force upper gripper 55 down to grip the sheet of surface material 99 against the lower gripper 35. The upper surface of lower gripper 35, on which the surface material 99 lies, is disposed slightly above the bottom face of electrode 17 in its down position. In the gripped position, the forward edges of grippers 35 and 55 may be in vertical alignment, but, preferably, the edge of the lower gripper 35 extends slightly beyond the edge of the upper gripper.

The movements are so timed and related that after the electrode 17 has reached its down position, the upper gripper 55 rises and the grippers move rearward, the electrode remaining down. When the grippers reach their rearmost point, the upper gripper 55 closes to grip the sheet of surface material and upon moving forward the grippers push the material ahead. Forward movement of the material is prevented at the electrode 17 by the attachment of the material to the backing sheet or by the electrode, which is then in its down position, Fig. 4, and the material folds or buckles and thereby forms an upwardly extending fold or row of loops. The downward pressure of the electrode 17 on the surface material 99 tends to cause the surface material to bend upwardly adjacent the electrode, as illustrated in Fig. 7, aiding in causing the fold or buckle to form upwardly instead of downwardly. When the electrode rises and the backing sheet with the surface material attached thereto is moved forward, the fold or loops of the material tend to flatten, Fig. 5. When the electrode descends, it forms the flattened fold or loops into U-shaped bights and presses the bights into the adhesive 58.5 on the backing sheet 58, as shown in Fig. 6. The grippers complete their forward movement simultaneously with the movement of the spike roll 81.

I prefer to form the end of the electrode 17 with a central groove with blunt edges so as not to cut or otherwise damage the soft surface material 99, Fig. 7. The groove may be formed into any desired shape such as a semi-circle or a gothic arch. When the electrode presses the surface material into the soft adhesive 58.5, some of the adhesive is retained in the groove and is not pressed out to the sides, thereby aiding in effecting a strong bond between the surface material and the backing fabric 58.

To operate the electrode 17, the cam 2, Fig. 1, on main shaft 1, causes lever 4 to rock shaft 5 which rocks lever 6 which is pivoted at 7 to rod 8 causing rod 8 and rod 10, connected to rod 8 by turnbuckle 9 to provide adjustment, to move up or down. Lever 12, pivoted at 11 to rod 10, rocks on shaft 13 and by shaft 14, pivoted in the end of lever 12, raises and lowers bracket 15 in which electrode 17 is held in clamps 16. Thereby electrode 17 is caused to rise and descend as determined by cam 2.

The high frequency electric field between the electrode 17 and the anvil 66, is timed to start by the arm 3 on shaft 1 when the electrode 17 is down. The interior conductor 71 of a coaxial cable 71, 72, Fig. 2, from a high frequency generator, is connected to the center of the anvil 66 through tubing 70 and stud 69. The anvil 66 is insulated by a block 67 of suitable insulating material, such as Mycalex, resting on support 68. The exterior conductor 72 of the coaxial cable is grounded both at the high frequency generator and at the mechanical apparatus, the electrode 17 being connected to the exterior conductor 72 by copper strap 88, Fig. 2.

The high frequency generator, Fig. 1, includes a high power triode tube 101 operating in a Colpitts oscillator circuit preferably at about 27 megacycles to furnish suitable high frequency power to electrode 17 and anvil 66 through the coaxial cable, the oscillator being preferably connected to the interior conductor 71 of the coaxial cable through a loading circuit consisting of condenser 103 and adjustable coil 105 to permit the oscillator to operate most efficiently into the load provided by the adhesive 58.5 and the surface material 99, and backing fabric 58. The triode tube 101 is provided with suitable high voltage by a full-wave rectifier circuit including diodes 107 and 108 and a high voltage transformer 109, while suitable filament voltages for diodes 107 and 108 and triode 101 are provided by transformers 111 and 113, respectively, said transformers being connected through a switch 115 to a source of alternating current at terminals 117 and 119.

The high frequency generator is energized, only when electrode 17 is in its lowered position in contact with the surface material 99, by an arm 3 on shaft 1, said arm being arranged to operate a switch 121 such as a mercury switch. Switch 121 actuates a timer, generally indicated at 123, which connects the high voltage transformer 109 to the alternating current source at terminals 117 and 119. The time interval of said timer is arranged to provide a suitable amount of high frequency power to the electrode 17 and anvil 66 during the time the bights of the surface material are pressed against the adhesive by the electrode 17 and then disconnect the transformer, thus effectively first starting and then cutting off the high frequency generator by control of the high voltage supply thereof.

According to the foregoing form of the invention the adhesive is set by heat, but my invention may be practiced by using a thermoplastic adhesive which sets upon cooling. Such adhesive is softened by the high frequency electric field so that the bights of the surface material are pressed by the descent of the electrode 17 into the softened adhesive. The adhesive, which is soft when heated, then cools and sets and thereby creates a firm bond between the bights of the surface material and the backing fabric. Except for the change in the sort of heat responsive adhesive, the operation of the method and apparatus is the same as above described with the use of the adhesive set by heat.

The thermoplastic adhesive is preferably a polyvinyl acetate. Other satisfactory and suitable thermoplastic adhesives may be prepared by utilizing any of the following thermoplastic resin bases: polyvinyl acetate, polyvinyl chloride, polyvinyl chloride-acetate, polyvinyl acetals, polyvinylidene chloride, polyacrylates, or the copolymers of these resins, compounded by well known methods.

With the aid of the device shown in Fig. 2a, high and low pile in the same transverse row may be produced in the surface material. The device shown in Fig. 2a provides for adjusting the electrode to cause it to descend closer to or farther from the ends of the grippers when in their forward position. The brackets 15 supporting the electrode-holding clamps 16 are rotatable on shaft 14. The clamps 16, and the electrode, are urged rearwardly by spring 162 to bear against a normally fixed stop roller 161, which may be adjusted forwardly or rearwardly and fixed in adjusted position by nuts 161a and 161b, as shown.

Figure 8:
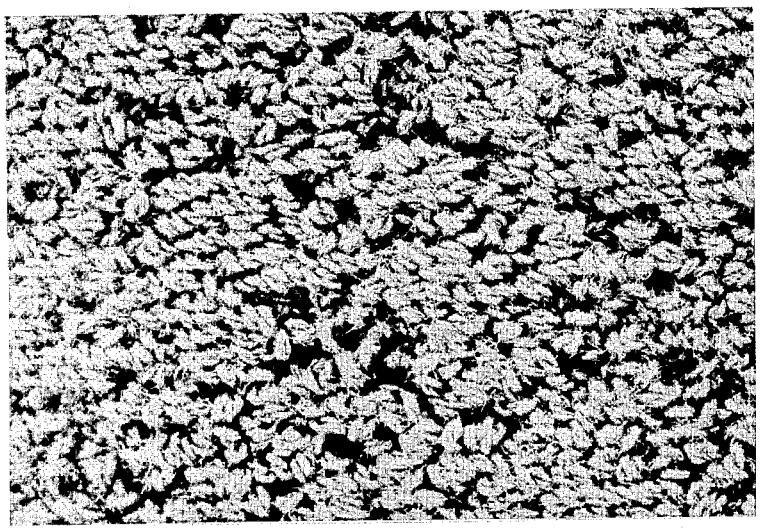
Fig. 8 is a photograph of the product wherein loops in the same row differ among themselves in height.
Figure 9:
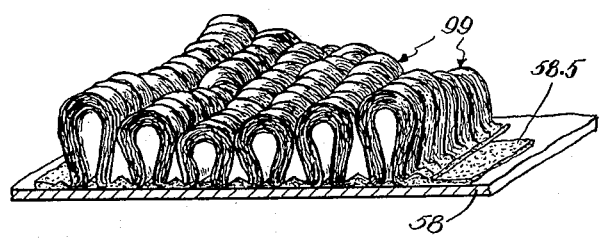
Fig. 9 is a cross-sectional view of the product of Fig. 8.

When a surface material, preferably composed of separate yarns or strands, is formed into an upward fold or row of loops, as shown in Fig. 5, the fold or "bulge" is not uniform in all the strands and the direction and/or the degree of "lean" of the fold forwardly or rearwardly, and in some instances sidewise, differs from strand to strand. When the electrode is adjusted, as described, to descend at or near the middle of the fold, it strikes some of the strands forwardly of their apex and others of the strands rearwardly of their apex, depending upon the "lean" of the fold in the particular strand. In the strands which the electrode strikes forwardly of the apex, i. e., on the side nearer the completed fabric, a short or low loop is produced, but in the strands which the electrode strikes rearwardly of the apex, i. e., on the side nearer the grippers, a higher loop is produced. Consequently the loops of the completed transverse row differ among themselves in height, as shown in Fig. 8 and Fig. 9.

The difference in height of the high and low loops so produced increases with increase in the pile height which the machine is adjusted to produce. The height of the fold may be increased by adjusting the pivot 22 and link 21 to increase the travel of the grippers in their forward and backward movement.

The high and low effect is also accentuated by an increase in the bulk of the yarn employed, which tends to increase the size of the bulge in the yarn when it is folded upwardly by the forward movement of the grippers. The bulge is not uniformly distributed among the yarns in a transverse row, resulting in a lack of uniformity in direction and/or degree of "lean" of the loop. Then, as described above, the electrode when it descends strikes some of the loops on one side of the apex and some on the other side so that loops of a variety of heights are produced.

Another way of accentuating the high and low effect is to shorten the space between rows. This may be done by shortening the movement of the spike rolls.

The stop 161 may be adjusted so as to bring the descending electrode so close to the edge of the grippers that it will strike all of the folds on their side nearer the grippers so that loops of substantially uniform, and relatively high, height are produced.

The present application is a continuation-in-part of my prior application, Serial No. 663,592, filed April 19, 1946, jointly with Henry A. Reinhardt, now abandoned.

I claim:

1. The method, adapted to produce a floor covering having a soft surface material securely adhered in transverse rows to a backing sheet by an adhesive, which comprises advancing a predetermined length of soft-surface material, depressing a portion of said length of said material, pressing the bottom of said depressed portion against a thermoresponsive adhesive material on the surface of said backing sheet, simultaneously heating the adhesive material between the bottom of said depressed portion and said backing sheet by applying a high frequency electric field to said adhesive to change the consistency of said adhesive, whereby said depressed portion is affixed to said backing sheet, and advancing said backing sheet with the affixed surface material a distance equal to that between the rows of surface material.

2. The method, adapted to produce a floor covering having a soft surface material securely adhered in transverse lines or rows to a backing sheet by an adhesive, which comprises advancing a predetermined length of soft-surface material, forming a bight in said length of said material, pressing said bight against a heat-settable adhesive material on the surface of said backing sheet, heating the adhesive material between said bight and said backing sheet by applying a high frequency electric field to said adhesive material to solidify said adhesive material, whereby said bight is secured to said backing sheet, and advancing said backing sheet with the surface material a distance equal to that between the rows of surface material.

3. An apparatus for producing a floor covering having a soft-surface material securely adhered in transverse lines or rows to a backing sheet by an adhesive, which comprises means for coating the backing sheet with an adhesive, an anvil over which the coated sheet is fed and intermittently caused to dwell during the attaching of the surface material to said coated backing sheet, a pair of grippers to grip the surface material and feed it into position over the backing sheet when said sheet is on the anvil, an electrode and means to operate it to press bights of the surface material against the adhesive on said backing sheet while said backing sheet dwells on said anvil, a high frequency electric generator connected to the electrode and to the anvil to apply a high frequency field to the adhesive material between the bights of the surface material and the backing sheet, and means for feeding the backing sheet with its coat of adhesive material onto the anvil and below the electrode and for advancing the backing sheet with the affixed surface material thereon step by step by a distance equal to that between two rows of the attached surface material.

4. The method of producing a non-woven pile fabric which comprises intermittently advancing a backing sheet having an adhesive thereon, periodically forming a sheet or layer of textile pile strands into a row of loops adjacent said adhesive and extending away therefrom, engaging said loops some on one side and some on the other side of their apexes, and pressing the engaged parts of the loops against said adhesive to affix them to said backing sheet.

5. A non-woven pile fabric comprising a backing sheet, a plurality of textile pile strands adhesively secured to said backing sheet along lines extending transversely of their length to form rows of upstanding loops in said strands between said lines, upstanding loops in the same rows and upstanding loops in the same strands differing among themselves in height so as to impart a high and low appearance to the pile face of the fabric.

6. An apparatus for producing a floor covering having a soft-surface material securely adhered in transverse lines or rows to a backing sheet by an adhesive, which comprises means for coating the backing sheet with an adhesive, an anvil over which the coated sheet is fed and intermittently caused to dwell during the attaching of the surface material to said coated backing sheet, a pair of grippers to grip the surface material and feed it into position over the backing sheet when said sheet is on the anvil, an electrode and means to operate it to press bights of the surface material against the adhesive on said backing sheet while said backing sheet dwells on said anvil, means for adjusting the position of said electrode longitudinally of the backing sheet, a high frequency electric generator connected to the electrode and to the anvil to apply a high frequency field to the adhesive material between the bights of the surface material and the backing sheet, and means for feeding the backing sheet with its coat of adhesive material onto the anvil and below the electrode and for advancing the backing sheet with the affixed surface material thereon step by step by a distance equal to that between two rows of the attached surface material.

7. The method of making carpets of the pile fabric type, which include a flexible sheet-like backing with a surface layer of an adhesive capable of being rendered effective by heat and, on subsequently cooling, hardening but remaining flexible; which comprises the steps of forming successive rows of pile, applying successive rows of said pile to the adhesive coated surface of said backing with each row spaced at a distance from a previously-applied row, and pressing each successive row of pile into intimate contact with the adhesive coated surface of said backing and simultaneously heating said adhesive coated surface along the line of each row of pile by high frequency dielectric heating.

8. The method of making carpet as defined in claim 7, wherein the successive rows of pile are applied transversely of the backing and in spaced relation longitudinally of said backing, and wherein the simultaneous pressing and heating of the adhesive is effected along the transverse line of each row of pile.

9. The method of making carpets as defined in claim 7, wherein the rows of pile are successively applied to said backing as transversely disposed, longitudinally spaced rows, and wherein the adhesive coated backing is advanced longitudinally step by step with respect to the line of application of said transverse rows to effect said longitudinal spacing of said rows on said backing.

10. The method of making carpets as defined in claim 7, wherein the backing with the successively applied rows of pile thereon is moved step by step between a pair of opposed, relatively movable combined pressing and electrode members; and wherein said members are successively moved together over each successively formed row of pile to press the individual rows into intimate contact with the adhesive on the backing and to simultaneously apply the high frequency dielectric heat to said rows during the interval between the step by step movement of said backing.

11. The method of making carpets as defined in claim 7, wherein the surface layer of adhesive is applied to the backing as said backing is moved toward the point of application of the successive rows of pile thereto.

12. The method of making carpets as defined in claim 7, wherein the adhesive applied to the surface of the backing consists of an ungelled mixture of polyvinyl chloride and a plasticizer.

13. The method of making carpets as defined in claim 7, wherein the body of the fabric made in accordance with said method is subsequently heated throughout to get any ungelled portion of the adhesive on said backing.

14. An apparatus for making carpet of the pile fabric type comprising a pair of elongated, axially aligned, relatively movable, combined pressing and electrode members, means for feeding an adhesive coated backing between said members in successive intermittent steps, means for applying successive elongated rows of pile to a surface of said adhesive coated backing, means for moving said members together over a row of said applied pile during the interval between the successive steps of movement of said backing, and means for applying a high frequency electric field to said members, whereby when said members are moved together over a row of pile said members press said pile into intimate contact with the adhesive on said backing and simultaneously apply a high frequency electric field to heat said adhesive.

15. Apparatus for making carpets as defined in claim 14, which includes means for applying adhesive to said backing prior to feeding said backing between said combined pressing and electrode members.

16. Apparatus for making carpets as defined in claim 14, which includes an auxiliary heater to gel any ungelled portion of the adhesive on said backing particularly those portions of the adhesive disposed between the successive rows of pile.

17. The method, adapted to produce a floor covering having a soft surface material securely adhered in transverse rows to a backing sheet by an adhesive, which comprises advancing a length of soft-surface material a predetermined amount, depressing a portion of said length of said material, pressing the bottom of said depressed portion against a thermoresponsive adhesive material on the surface of said backing sheet, simultaneously heating the adhesive material between the bottom of said depressed portion and said backing sheet by applying a high frequency electric field to said adhesive to change the consistency of said adhesive, whereby said depressed portion is affixed to said backing sheet, and advancing said backing sheet with the affixed surface material a distance equal to that between the rows of surface material.

18. The method, adapted to produce a floor covering having a soft surface material securely adhered in transverse rows to a backing sheet by an adhesive, which comprises advancing a length of soft-surface material a predetermined distance, depressing a portion of said length of said material, pressing the bottom of said depressed portion against an adhesive on the surface of said backing sheet, comprising a dispersion of a finely-divided polyvinyl chloride polymer in a plasticizer, simultaneously heating the adhesive material between the bottom of said depressed portion and said backing sheet by applying a high frequency electric field to said adhesive to set said adhesive, whereby said depressed portion is affixed to said backing sheet, and advancing said backing sheet with the affixed surface material a distance equal to that between the rows of surface material.

CHARLES R. JOHNSON.

References Cited in the file of this patent
UNITED STATES PATENTS

| Number | Name | Date |
|---|---|---|
| 1,914,962 | Smith | June 20, 1933 |
| 2,033,325 | Clapp | Mar. 10, 1936 |
| 2,116,048 | Smith | May 3, 1938 |
| 2,160,154 | Kellogg et al. | May 30, 1939 |
| 2,312,129 | Smith | Feb. 23, 1943 |
| 2,352,131 | Smith | June 20, 1944 |
| 2,515,847 | Winkler | July 18, 1950 |